United States Patent
Simeoli et al.

(10) Patent No.: US 10,123,515 B2
(45) Date of Patent: Nov. 13, 2018

(54) AQUARIUM BACTERIA MANAGEMENT DEVICE

(71) Applicants: David Simeoli, American Fork, UT (US); Georganne Simeoli, American Fork, UT (US)

(72) Inventors: David Simeoli, American Fork, UT (US); Georganne Simeoli, American Fork, UT (US)

(73) Assignee: Aerobic Living, LLC, American Fork, UT (US)

( * ) Notice: Subject to any disclaimer, the term of this patent is extended or adjusted under 35 U.S.C. 154(b) by 454 days.

(21) Appl. No.: 14/864,667

(22) Filed: Sep. 24, 2015

(65) Prior Publication Data

US 2016/0081311 A1    Mar. 24, 2016

Related U.S. Application Data

(60) Provisional application No. 62/054,794, filed on Sep. 24, 2014.

(51) Int. Cl.

| | | |
|---|---|---|
| *A01K 63/04* | (2006.01) | |
| *A01K 63/06* | (2006.01) | |
| *C02F 3/00* | (2006.01) | |
| *C02F 3/06* | (2006.01) | |
| *C02F 103/20* | (2006.01) | |
| *C02F 1/461* | (2006.01) | |

(52) U.S. Cl.
CPC .......... *A01K 63/04* (2013.01); *A01K 63/042* (2013.01); *A01K 63/045* (2013.01); *A01K 63/06* (2013.01); *C02F 3/005* (2013.01); *C02F 3/06* (2013.01); *C02F 2001/46152* (2013.01); *C02F 2103/20* (2013.01); *C02F 2201/009* (2013.01); *Y02A 20/212* (2018.01); *Y02W 10/15* (2015.05)

(58) Field of Classification Search
CPC ...... A01K 63/04; A01K 63/06; A01K 63/045; A01K 63/042
See application file for complete search history.

(56) References Cited

U.S. PATENT DOCUMENTS

| | | | | |
|---|---|---|---|---|
| 3,752,747 A | * | 8/1973 | Treharn ................. | C02F 1/467 119/200 |
| 3,891,535 A | * | 6/1975 | Wikey ................... | A01K 63/04 119/231 |
| 4,257,352 A | * | 3/1981 | Habegger .............. | A01K 63/04 119/245 |
| 4,769,119 A | * | 9/1988 | Grundler ............... | C02F 1/4606 204/229.7 |
| 5,148,772 A | * | 9/1992 | Kirschbaum .......... | A01K 63/04 119/245 |

* cited by examiner

*Primary Examiner* — Kristen C Hayes
(74) *Attorney, Agent, or Firm* — Thorpe North & Western

(57) ABSTRACT

An aquarium bacteria management device may include a tank configured to contain a fluid and a light source configured to illuminate the tank. Electrodes may extend into the tank and be spaced apart from one another. The electrodes may introduce a first electric current through the fluid between the electrodes. A photovoltaic panel may be positioned to receive illumination from the light source and to convert the illumination into a second electric current in order to provide the first electric current to the electrodes.

19 Claims, 4 Drawing Sheets

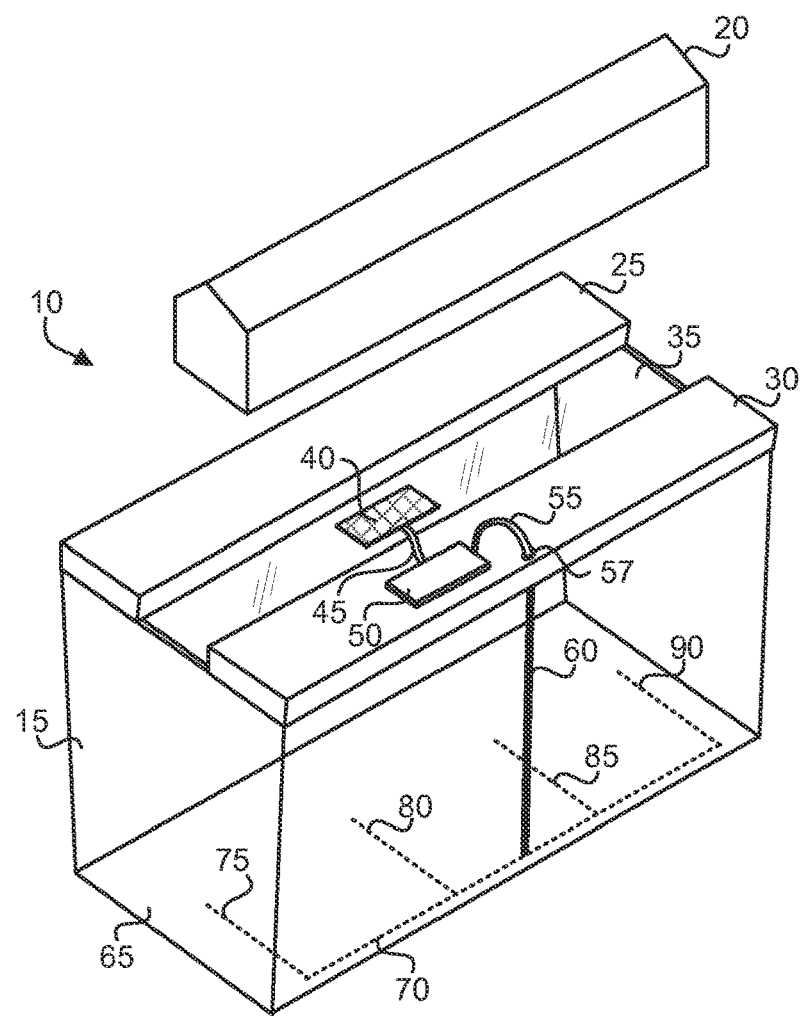
FIG. 1A
FIG. 1B  FIG. 1C

AQUARIUM BACTERIA MANAGEMENT DEVICE

RELATED APPLICATION

This application claims the benefit of U.S. Provisional Application No. 62/054,794 filed on Sep. 24, 2014, which is incorporated herein by reference.

BACKGROUND

Typically, aquariums contain fish or other aquatic organisms, water, various organic materials, and multiple types of bacteria. One type of bacteria "feeds" on organic materials, such as the fecal matter of fish, fish food, portions of aquatic plants, etc. Some bacteria consumes organic materials partially and leaves behind the remainder to rot and foul the water by way of cloudiness, elevated toxins and a rancid smell. Resulting elevated nitrates, nitrites and ammonia, in sufficient concentration in the aquarium water, can kill fish and other aquatic organisms.

Another type of bacteria commonly present in aquariums feeds on ammonia, reducing the potentially toxic ammonia concentration in the aquarium water. However, the first harmful type of bacteria can multiply very rapidly, especially when excess organic material is introduced into the aquarium water. Such excess can occur through excess feeding of the fish, the death of a fish or aquatic plant, or the addition of fish to the aquarium. As a result, the harmful bacteria may reproduce rapidly, producing ammonia at a rate much greater than the beneficial bacteria consume the ammonia. When the ammonia reaches a sufficient concentration, a large number of expensive fish may rapidly die. In order to avoid this cycle, introduction of new fish into an aquarium is often done one at a time, over a protracted time period, so that a balance between the ammonia producing bacteria and the ammonia consuming bacteria can be maintained.

In addition to the ammonia produced by the action of bacteria on organic matter, fish urine is an additional source of ammonia. Conventional activated charcoal water filters have been employed to reduce the ammonia concentration, but these filters are expensive and must be frequently changed and maintained.

Other types of bacteria found in aquarium water can produce disease in both fish and humans. Individuals who work in the field of aquarium services and cleaning are particularly susceptible to such diseases.

If reproduction of bacteria is inhibited, then decay of organic matter will be slowed, reducing the spread of disease, cloudiness of the water will be minimized, and a relatively small number of ammonia consuming bacteria will still be adequate to prevent the ammonia, nitrates and nitrites from reaching a toxic concentration.

SUMMARY

An aquarium bacteria management device may include a tank configured to contain a fluid and a light source configured to illuminate the tank. Electrodes may extend into the tank and be spaced apart from one another. The electrodes may introduce a first electric current through the fluid between the electrodes. A photovoltaic panel may be positioned to receive illumination from the light source and to convert the illumination into a second electric current in order to provide the first electric current to the electrodes.

The device may further include a power supply. The power supply may include a rechargeable battery electrically coupled between the electrodes and the photovoltaic panel and configured to receive the second electric current from the photovoltaic panel. The power supply may further include a voltage regulator to regular voltage to the electrodes from the rechargeable battery such that a potential difference is created between the electrodes to introduce the first electric current.

The present technology may, upon installation or implementation, eliminate or reduce tank cycling by controlling or managing bacteria to eliminate or reduce typical rising toxins (ammonia, nitrates and nitrites) which can result in the death of fish.

There has thus been outlined, rather broadly, the more important features of the technology in order that the detailed description thereof that follows may be better understood, and in order that the present contribution to the art may be better appreciated. There are, of course, additional features of the technology that will be described hereinafter and which will form the subject matter of the claims appended hereto. In this respect, before explaining at least one embodiment of the technology in detail, it is to be understood that the technology is not limited in its application to the details of construction and to the arrangements of the components set forth in the following description or illustrated in the drawings. The technology is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present technology.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1A is a rear perspective view of an aquarium including an aquarium bacteria management device in accordance with an example of the present technology;

FIGS. 1B-1C illustrate a cork configuration for sealing a tube encasing the wires in accordance with an example of the present technology;

FIG. 3A is a top view of a photovoltaic panel for use in the aquarium bacteria management device of FIG. 1A;

FIG. 3B is a bottom view of the photovoltaic panel of FIG. 3A with a cover panel removed;

Figure 2A:
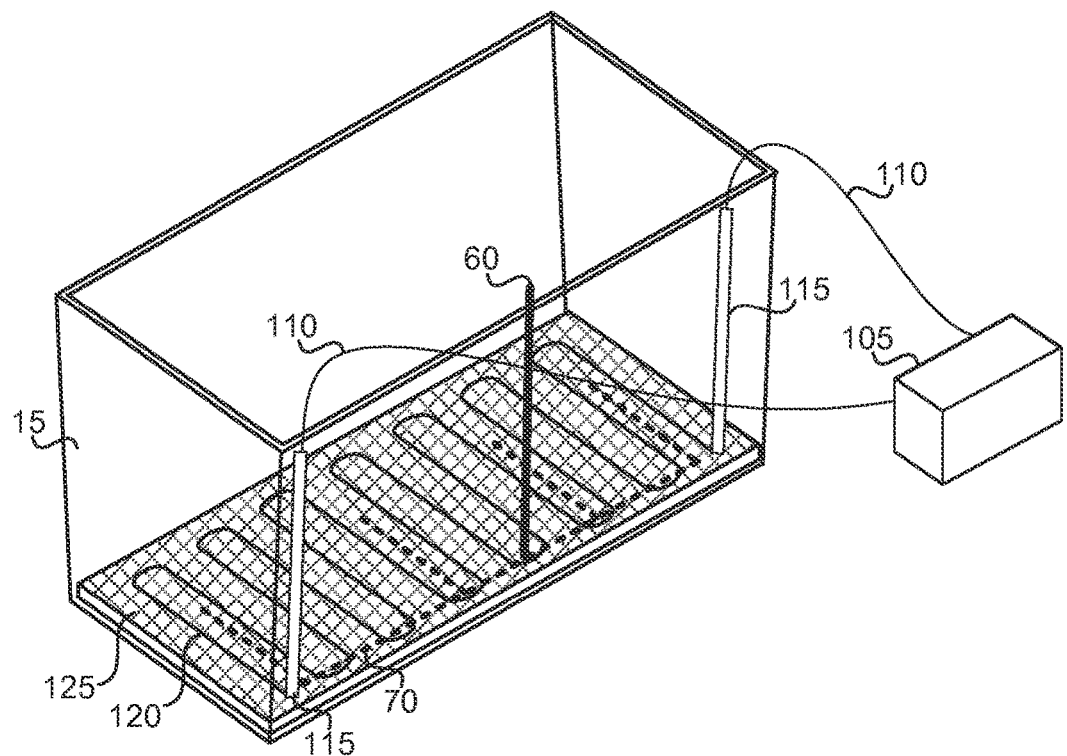
FIG. 2A is a rear perspective view of an aquarium including an under-gravel filter with an air pump in accordance with an example of the present technology.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

In describing and claiming the present invention, the following terminology will be used in accordance with the definitions set forth below.

As used herein, "electrically coupled" refers to a relationship between structures that allows electric current to flow at least partially between them. This definition is intended to include aspects where the structures are in physical contact and those aspects where the structures are not in physical contact. Typically, two materials which are electrically coupled can have an electrical potential or actual current between the two materials. For example, two plates physically connected together by a resistor are in physical contact, and thus allow electric current to flow between them. Conversely, two plates separated by a dielectric material are not in physical contact, but, when connected to an alternating current source, allow electric current to flow between them by capacitive current. Moreover, depending on the insulative nature of the dielectric material, electrons may be allowed to bore through, or jump across the dielectric material when enough energy is applied.

As used herein, "adjacent" refers to near or close sufficient to achieve a desired effect. Although direct physical contact is most common and preferred in the structures or volumes of the present invention, adjacent can broadly allow for spaced apart features.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "about" and "approximately" are used to provide flexibility to a numerical range endpoint by providing that a given value may be "a little above" or "a little below" the endpoint with a degree of flexibility as would be generally recognized by those skilled in the art. Further, the term about explicitly includes the exact endpoint, unless specifically stated otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

Referring now to FIG. 1A, an aquarium bacteria management system 10 or fish tank bacteria management system is illustrated from a rear perspective view, in accordance with an example of the present technology. The system 10 may include an aquarium 15 (or tank) having side walls and a base 65, the aquarium 10 being configured to contain a fluid, such as water, as well as fish or other aquatic organisms, and any number of other devices, structures, etc. as may be recognized by one having ordinary skill in the art. The aquarium 10 may have an at least partially open top portion, through which maintenance, feeding, etc. may be performed. In one example, the fish tank device may include a tank lid. The tank lid may have multiple sections. For example, the tank lid may include a hinged lid 25, a glass panel 35 (or other transparent panel), and a rear deck cover 30. The tank lid may be removable from the aquarium 10. The hinged lid 25 may be openable and closeable to access the aquarium 10 without completely removing the tank lid. The rear deck cover 30 may have an aperture 57 formed therethrough. The aperture may facilitate insertion of wires 55 (with or without encasing as at 60) through the rear deck cover 30 and into the aquarium 10.

The tube-encased wires 55 may include electrodes 70 for electrically inhibiting bacteria growth and reproduction therein, at least of the ammonia-producing bacteria. It is further believed that the electrical stimulation stimulates the growth and/or activity of aerobic bacteria while suppressing anaerobic bacteria. The wires 55 may be encased in sheathing, tubing or the like to inhibit algae build-up and rust. In an example where the wires 55 are encased in one or more tubes 60, a cork 95 (with through-hole for wires) or cork 100 (without through-hole), stopper, filler, sealant, adhesive or any other suitable sealing device may be used at the end of the tube(s) 60 encasing the wires 55 to seal off the interior of the tube(s) 60 containing the wires 55 to create a water-tight condition, which further assists in preventing algae buildup inside the tube 60 and on the wires 55. Sealing the tube(s) 60 in this manner may eliminate or significantly reduce, or at least simplify, difficult cleaning of the tube and wires.

The wires 55 may include a positive electrode and a negative electrode. The positive electrode may, for example, be a carbon graphite wire or a wire that is coated in carbon graphite. The negative electrode may, for example, be a zinc wire or a wire that is coated with zinc. While other types of materials may also or alternatively be used for the positive or negative electrode wires or wire coatings, the example materials provided enable creation of a suitable electric potential between the electrodes 70, while also inhibiting rust and maintaining flexibility to accommodate a variety of different sizes or shapes of aquarium devices. A positive voltage or charge may be introduced into the fluid in the aquarium 10 via the positive electrode and a negative voltage or charge may be introduced into the fluid in the Aquarium 10 via the negative electrode. In one example, the positive and negative electrodes 70 may introduce a potential difference, where a voltage on one of the electrodes 70 is higher or lower than at the other, to induce a flow of electric current through the fluid in the aquarium 10. In one example, the electrodes 70 of FIG. 1A may be divided into a plurality of pairs of electrodes, including pair 75, 80 and pair 85, 90. Each pair 75, 80 or 85, 90 may include positive and negative electrodes. Alternatively, each pair may include electrodes of a single polarity, such that one pair 75, 80 includes negative electrodes and another pair 85, 90 includes positive electrodes. The electrodes 70 may be wires 55 or electrically coupled to the wires 55.

The wires 55 may be electrically coupled to a power supply 50. While the power supply may optionally be an alternating current (AC) power supply, according to a preferred embodiment, the power supply may include a direct current (DC) power supply, such as a battery 145. The battery 145 may be a rechargeable battery contained in a housing 155 having electrical contacts interfacing between the terminals of the battery 145 and the wires 55. In one example, the battery 145 may be a 1.5V AA battery, a 9V battery, etc. The battery 145 may be a lithium, alkaline, carbon zinc, silver zinc, zinc air, nickel metal hydride (NiMH), nickel cadmium (NiCD), lithium ion or other suitable type of fuel cell, and may be rechargeable or non-rechargeable. The housing 155 of the power supply 50 may include an LED (light emitting diode) indicator 135 indicating a charging condition of the battery 145 or other metering/monitoring equipment such as a redox meter or other water quality monitoring equipment. The power supply may include further electrical components, such as a voltage regulator/reducer 150.

The fish tank device may include a photovoltaic panel 40. A photovoltaic panel refers to a panel designed to absorb the electromagnetic rays from the sun or other light sources, such as artificial lighting, as a source of energy for generating electricity. The photovoltaic panel 40 may be electrically coupled to the power supply 50. The photovoltaic panel 40 may be configured to produce, for example, between 50-100 mAh of electric current and from 2.4-3.0 volts of electricity. The photovoltaic panel may be operable to produce electric current to charge the rechargeable battery. In one example, the photovoltaic panel 40 may provide an electric current or voltage differential directly to the wires 55 without the intervening power supply 50. The photovoltaic panel may be coupled directly or indirectly to the electrodes 70 or to the power supply. When a light source is available, such as sunlight during the day or when an artificial light directs light to the photovoltaic panel, the photovoltaic panel may produce a direct current (DC) which may flow through the fluid in the tank to stimulate the bacteria. Alternatively, the direct current may charge a rechargeable battery at the power supply and the rechargeable battery may provide a voltage differential which results in a direct current (DC) flowing through the fluid in the tank. Use of the power supply to produce the electric current rather than directly using the electric current produced by the photovoltaic panel may enable a more regulated and regular electric current to be introduced to the fluid, both when a lighting source is available and when the light source is unavailable (e.g., night or lighting turned off).

The photovoltaic panel 40 can be placed to receive illumination from a light source 20. The light source 20 may be positioned to direct light through the glass panel 35 of the lid B. The light source 20 may be an artificial light source and may produce an electromagnetic radiation which is suitable for conversion to an electric current via the photovoltaic panel 40. The photovoltaic panel may be selected for maximum efficiency from the type of light source providing the illumination. The light source 20 may be powered by a different power supply than power supply 50. The photovoltaic panel 40 may be positioned between the glass panel 35 and the light source 20, or may alternatively be placed on an opposite side of the glass panel 35 from the light source 20. The power supply 50 may preferably be placed or affixed to an outer side of the rear deck 4. When the photovoltaic panel 40 is on an opposite side of the glass panel 35 as the light source 20, an additional aperture may be included in the rear deck 4 through which wires electrically coupling the photovoltaic panel 40 to the power supply 50 may pass. When the photovoltaic panel 40 is between the glass panel 35 and the light source 20, the photovoltaic panel may optionally be simply placed, without affixation, on the glass panel 35 and be supported by the glass panel 35. When the photovoltaic panel 40 is on an opposite side of the glass panel 35 as the light source 20, the photovoltaic panel 40 may be affixed to the glass or may be held in position by wires which are optionally deformable and have sufficient rigidity to maintain a position of the photovoltaic panel 40 to receive the electromagnetic radiation from the light source 20. In either embodiment where the photovoltaic panel 40 is between the glass panel 35 and the light source 20 or is on an opposite side of the glass panel 35 as the light source 20, the photovoltaic panel may optionally be affixed to the glass panel 35 such as by adhesive (e.g., tape, glue, putty, etc.) or other any other suitable affixation device.

As further illustrated in FIG. 1A, the wires 55 may extend substantially along an entire height of the aquarium 10, from the rear deck 4 to the base 65 of the aquarium, and may extend along the base 65. For example, the electrodes 70 may extend from a point at the base 65 of the aquarium between lengthwise ends of the aquarium 10 way from one another towards opposite ends of the aquarium. The electrodes 70 may extend along a majority of a width and/or a length of a base 65 of the tank 15. The electrodes 70 may further be angled, curved, bent, spliced, etc. to extend away from an edge of the aquarium to a position between the point between the lengthwise ends of the aquarium 10 and the ends of the aquarium 10, as illustrated in FIG. 1A.

The wires 55 may be encased in the tube 60 in a vertical direction, where ends of the tube 60 are sealed with the cork 95 or 100 near an upper portion of the aquarium and near a lower portion of the aquarium, as shown in FIGS. 1B-1C. A portion of electrodes 70 extending along the base 65 of the aquarium may optionally be further partially encased in plastic or other material, or may optionally be in electrical contact with the fluid in the aquarium from the cork 95 or 100 near the lower portion of the aquarium and the ends of the electrodes 70.

The aquarium 10 may contain, for example, aquatic plants, fish food flakes, and aquatic organisms, such as fish. The aquarium 10 may be filled with water to a water level, and may have gravel provided at a base 65 thereof. Electric current may flow from a negative electrode towards a positive electrode through the water. The electrodes 70 may be formed from a relatively stiff wire, such that the electrodes 70 will hold a deformed shape beneath the water level. The power supply 50 may produce a relatively low current, in the range of 0.1 to 10 milliamperes, at a voltage in the range of 0.1 to 5.0 VDC. FIGS. 3A-3D illustrate examples of a photovoltaic panel and power supply for use with the bacteria management device.

Figure 2B:
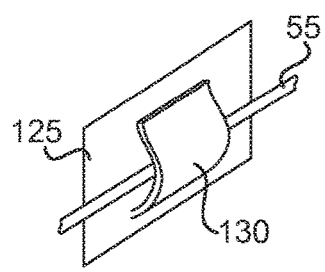
FIG. 2B illustrates a retaining clip on an under-gravel filter for retaining an electrode in accordance with an example of the present technology.

Referring to FIG. 2A, an extruded plenum may rest on a bottom of the aquarium 10, allowing air to circulate below gravel that may be present in the bottom of the aquarium. The extruded plenum may be an under-gravel filter 125. The under-gravel filter 125 may be positioned to at least partially cover the electrodes extending along the base of the tank. Provision of air below the gravel (e.g., from an air pump) may aid in aerobic bacterial activity. The extruded plenum may be an under-gravel filter 125. Retaining clips 130 or other suitable retaining structure or devices may be molded into the under-gravel filter 125 or otherwise provided to securely hold one or more electrodes 70 in place at the bottom of the aquarium 10, preventing the electrodes 70 from surfacing above the gravel, as shown in FIG. 2B. The electrodes 70 may, for example, be secured against an upper surface of the under-gravel filter 125. However, the electrodes 70 may alternatively be secured against a lower or inner surface of the under-gravel filter 125. Any number or type of clips, adhesive, or other retaining devices may be utilized as desired to secure the electrodes 70.

A standard air pump 105 may be used to provide air to the under-gravel filter 125, allowing for air circulation while pulling down suspended matter in the water to the gravel and to the under-gravel filter 125. Air tubes 115 from the pump 105 may extend down one or more air tube columns to provide the air circulation via the under-gravel filter 125. Air from the air tubes may be pumped into the water under the plenum directly where the air tubes from the pump 105 reach the plenum or near the base 65 of the aquarium. Alternatively, the plenum may include one or more air tubes coupled thereto or integrally formed therein to direct the air away from the vertically extending air tubes. The plenum air tubes may optionally include a plurality of air holes spaced along a length of the tubes to release air in a distributed manner.

In a more specific embodiment, an air injection device may be molded into the under-gravel filter 125 to facilitate injection of air from air line 120 (via tubes 110, 115) into the fluid in the aquarium 10. Air line 120 may be snaked through the under-gravel filter 125 to provide air to any number of air injection devices (not shown) at any number of positions or locations throughout the under-gravel filter 125. The air injection devices may include holes through which the air is released into the fluid. The air may be released from the air injection device(s) as tiny air bubbles into a space below or above the plenum. For example, when the air injection device(s) is/are formed at a top surface of the under-gravel filter 125, the air bubbles may be emitted into gravel (or a bacterial field), providing oxygen to aid aerobic bacterial activity. The injection of air bubbles into the fluid also provides desirable visual effects. The air injection device also provides a function of preventing certain fish (such as cichlids, for example) from re-arranging gravel or digging up electrodes 70, which may otherwise reduce efficiency and performance of the fish tank bacteria management device.

Figure 2C:
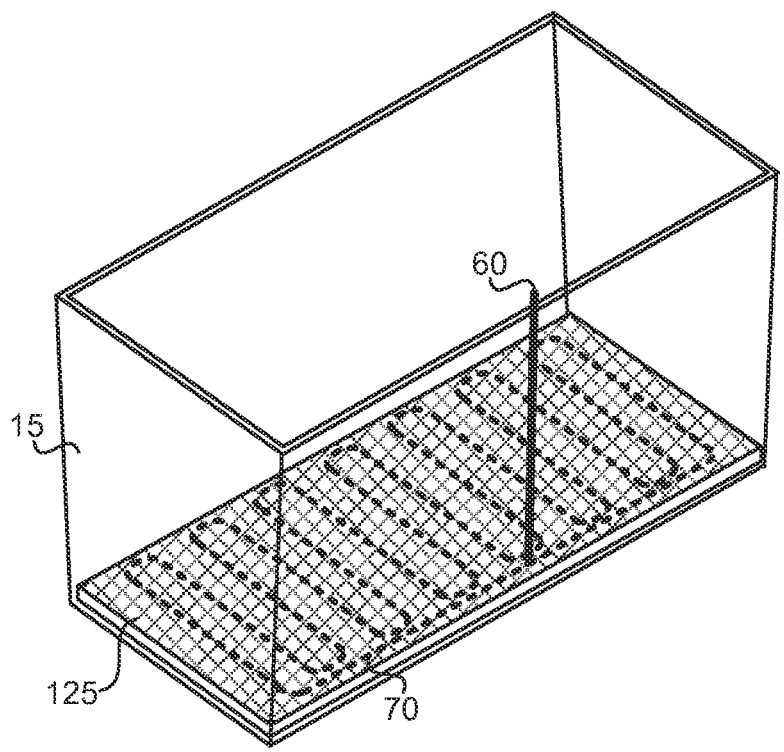
FIG. 2C illustrates a serpentine electrode retained by an under-gravel filter in accordance with an example of the present technology.

FIG. 2C illustrates another example embodiment of the present technology where rather than using spatially separated positive and negative electrodes 75-90, the electrode 70 is a continuous serpentine electrode extending from a negative terminal to a positive terminal of the power supply 50. In this example, the circuit may be completed entirely by the electrode 70 rather than including the fluid in the tank 15. The electrode 70 may be attached to the under-gravel filter 125 to maintain the positioning. The serpentine arrangement of the electrode 70 may be similar to or correspond with the airline 120. In one example, same retaining clips 130 may be used to retain both the electrode 70 and the airline 120. Even though the electric circuit in this example is completed by the electrode 70, an electric current may still pass through the fluid in the tank 15.

It is noted that the bacteria management device described herein is not limited to any particular type or size of aquarium or aquatic enclosure. For example, the bacteria management device may be used in large aquariums, in ponds or other aquatic environments.

For larger aquariums, the aquarium bacteria management device may include additional electrodes, additional or larger photovoltaic panel 40 or power supply 50, and so forth. The power supply 50 may maintain an electric potential between each adjacent pair of positive and negative electrodes of from about 1.5 VDC to about 5.0 VDC, with a current in the range of about 0.1 to 10 milliamperes per pair of electrodes.

Figure 3C:
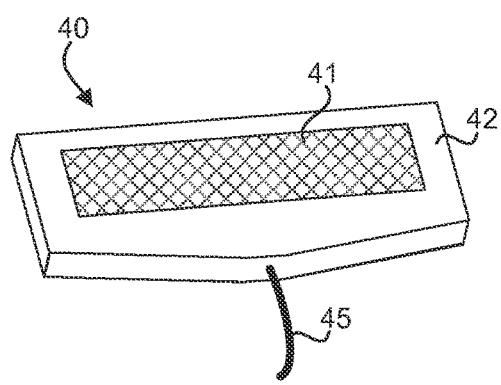
FIG. 3C illustrates the photovoltaic panel of FIG. 3A coupled to a power supply.
Figure 3C:
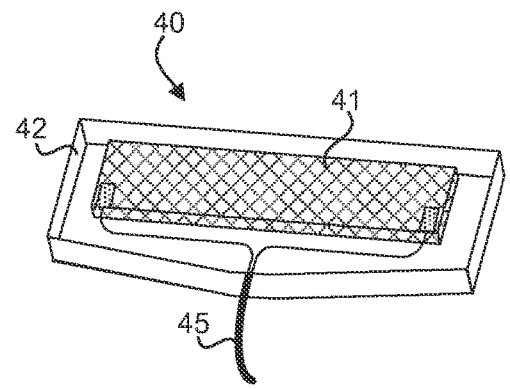
Figure 3C:
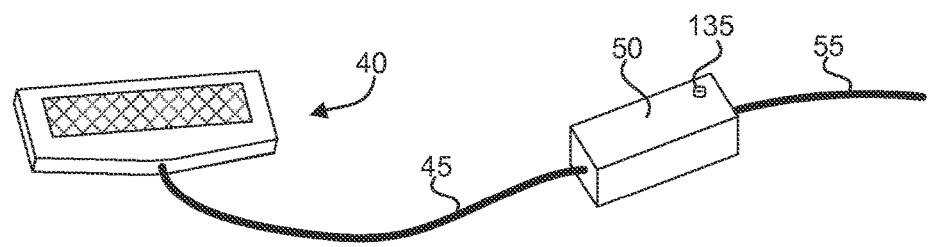
Figure 3D:
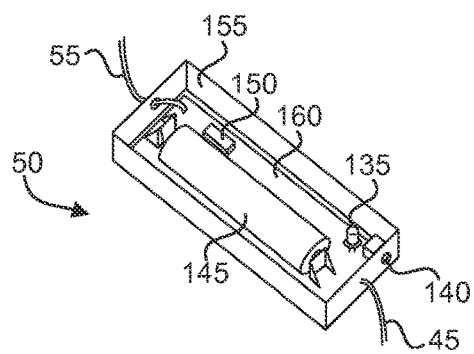
FIG. 3D illustrates components of a power supply for use with the present technology.

FIGS. 3A-3D illustrate various features of example photovoltaic devices 40 and power supplies 50. FIGS. 3A-3B illustrate a photovoltaic panel 41 for use in an aquarium bacteria management system. The photovoltaic panel 41 may be enclosed in a housing 42 and coupled to a wire 45. As illustrated in FIG. 3C, the photovoltaic panel 40 may be coupled to a power supply 50, including an LED 135 or other notification light to indicate that the photovoltaic panel 40 is working (i.e., converting light energy into electric current). The LED 135 may indicate that the battery 145 is charging. FIG. 3D illustrates components of a power supply 50 for use with the present technology. Specifically, the power supply 50 includes a housing 155 to house various components, such as a battery 145, a voltage regulator 150, an LED 135, and an A/C adapter 140 for receiving alternating current from an alternating current power supply. The A/C adapter 140 may be useful when the battery has insufficient charge and/or there is insufficient illumination on the photovoltaic panel 40 to provide a current to the electrodes 70. Wires 45 and 55 extending from the photovoltaic panel 40 and to the electrode 70, respectively, may be received through the housing and coupled to a circuit board 160 in the housing 155.

The aquarium bacteria management device/system described herein may be provided as an aquarium unit including a tank. However, it may alternatively be provided as a kit which does not include the tank or some other aquarium features, such as a light source, cover, etc. The kit may include the photovoltaic panel, the power supply, and the electrodes. The kit may optionally further include one or more of the tank, the under-gravel filter, the air pump, or other features described herein.

With the aquarium bacteria management device as has been set forth, the need for external filters, such as filters including activated charcoal, may be obviated. Maintenance of such external filters may thus be eliminated. The interval between aquarium water changes may also be significantly increased from conventional intervals, such as up to approximately one or two years between water changes. Maintenance between water changes may include periodic cleaning of the electrodes.

In addition to reduction of maintenance and external filters, the bacteria management device and/or under-gravel water filter disclosed places oxygen in the gravel bed, aiding aerobic bacterial activity and preventing cichlids from exposing the under-gravel water filter, making it ineffective, which is a known, long-standing cichlid/under-gravel filter issue. The bacteria management device further provides the additional benefit of creating realism with tiny, slow rising oxygen bubbles in the aquarium.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An aquarium bacteria management device, comprising:
a tank configured to contain a fluid;
a light source configured to illuminate the tank;
electrodes extending into the tank and spaced apart from one another to introduce a first electric current through the fluid between the electrodes, wherein the electrodes extend along a majority of a width and a length of a base of the tank; and
a photovoltaic panel electrically coupled to the electrodes and positioned to receive illumination from the light source, the photovoltaic panel being configured to convert the illumination into a second electric current in order to provide the first electric current to the electrodes.

2. The device of claim 1, further comprising:
a rechargeable battery electrically coupled between the electrodes and the photovoltaic panel and configured to receive the second electric current from the photovoltaic panel; and
a voltage regulator to regulate voltage at the electrodes such that a potential difference is created between the electrodes to introduce the first electric current.

3. The device of claim 1, wherein the electrodes comprise a positive electrode and a negative electrode, the positive electrode comprising a carbon graphite wire or a carbon graphite coated wire, and the negative electrode comprising a zinc wire or a zinc coated wire.

4. The device of claim 1, further comprising an under-gravel filter positioned to at least partially cover the electrodes extending along the base of the tank.

5. The device of claim 4, further comprising an air pump to introduce air into the fluid beneath the under-gravel filter.

6. The device of claim 4, wherein the electrodes are each divided into a plurality of electrodes forming electrode pairs of opposing charges.

7. The device of claim 4, wherein the under-gravel filter further comprises retaining clips to hold the electrodes in a predetermined position relative to the under-gravel filter.

8. The device of claim 1, wherein the photovoltaic panel directly energizes the electrodes and the first current is the second current.

9. The device of claim 1, wherein the photovoltaic panel is supported above the tank and below the light source by a transparent panel on top of the tank for supporting the light source.

10. The device of claim 1, wherein the photovoltaic panel is adhered to a bottom of a transparent panel on top of the tank for supporting the light source.

11. The device of claim 1, wherein the photovoltaic panel is suspended in air by rigid wires electrically coupling the photovoltaic panel to the electrodes.

12. The device of claim 1, further comprising tubing to encase a portion of the electrodes between the photovoltaic panel and a base of the tank.

13. An aquarium bacteria management device, comprising:
a pair of electrodes configured to extend from outside an aquarium tank to an inside of the aquarium tank, at least a lower portion of the pair of electrodes being flexible and separable to enable spacing the lower portion of each electrode in the pair apart from one another, the electrodes having a rigid protective casing over an upper portion thereof;
an under-gravel filter comprising a plurality of retaining devices spaced apart from one another and configured to retain a position of the lower portions of each electrode relative to the under-gravel filter;
a rechargeable battery electrically coupled to the upper portion of the pair of electrodes and configured to create a potential difference across the electrodes to induce electric current through a fluid inside the aquarium tank; and
a photovoltaic panel electrically coupled to the rechargeable battery and positioned to receive illumination from an artificial light source, the photovoltaic panel being configured to convert the illumination into an electric current to charge the rechargeable battery.

14. The device of claim 13, further comprising a housing containing the rechargeable battery, the housing being supportable by a deck on a top of the aquarium tank.

15. The device of claim 13, further comprising a plurality of removable sealing devices at opposite ends of the protective casing, the sealing devices being configured to admit the upper portion of the electrodes into the protective casing while sealing to protective casing to prevent fluid entry.

16. The device of claim 13, wherein the photovoltaic panel is configured to produce between 50-100 mAh of electric current.

17. The device of claim 13, wherein the photovoltaic panel is configured to produce from 2.4-5.0 volts of electricity.

18. An aquarium bacteria management device, comprising:
a wire configured to extend from outside an aquarium tank to an inside of the aquarium tank, at least an upper portion of the wire being encased in a rigid protective casing;
an under-gravel filter comprising a plurality of retaining clips spaced apart from one another and configured to retain a position of the lower portions of each electrode relative to the under-gravel filter;
a rechargeable battery electrically coupled to the wire to induce electric current through the wire submersed in a fluid inside the aquarium tank; and
a photovoltaic panel electrically coupled to the rechargeable battery and positioned to receive illumination from an artificial light source, the photovoltaic panel being configured to convert the illumination into an electric current to charge the rechargeable battery;
wherein the retaining clips are arranged on the under-gravel filter to retain the wire on a bottom side of the under-gravel filter such that the wire extends along a base of the aquarium tank in a serpentine path.

19. The device of claim 8, further comprising an alternating current adapter to enable use of an alternating current power source to provide the current in the absence of the illumination.

* * * * *